Aug. 12, 1924.

R. H. BERKLEY 1,504,419

MESH MEASURING MACHINE

Filed Nov. 10, 1920

Inventor
Richard H. Berkley
By his Attorneys
Pennie, Davis, Marvin & Edmonds.

Aug. 12, 1924.

R. H. BERKLEY 1,504,419

MESH MEASURING MACHINE

Filed Nov. 10, 1920

Inventor
Richard H. Berkley
By his Attorneys
Pennie, Davis, Marvin & Edmonds.

Aug. 12, 1924.

R. H. BERKLEY

MESH MEASURING MACHINE

Filed Nov. 10, 1920

Inventor
Richard H. Berkley
By his Attorneys
Pennie, Davis, Marvin & Edmonds.

Patented Aug. 12, 1924.

1,504,419

UNITED STATES PATENT OFFICE.

RICHARD HATLEY BERKLEY, OF PLAINVILLE, MASSACHUSETTS, ASSIGNOR, BY MESNE ASSIGNMENTS, TO WHITING & DAVIS COMPANY, OF PLAINVILLE, MASSACHUSETTS, A CORPORATION OF MASSACHUSETTS.

MESH-MEASURING MACHINE.

Application filed November 10, 1920. Serial No. 423,002.

*To all whom it may concern:*

Be it known that I, RICHARD H. BERKLEY, a citizen of the United States, residing at Plainville, in the county of Norfolk, State of Massachusetts, have invented certain new and useful Improvements in Mesh-Measuring Machines; and I do hereby declare the following to be a full, clear, and exact description of the invention, such as will enable others skilled in the art to which it appertains to make and use the same.

In the operation of making mesh bags of the type commonly used by women for carrying small articles, it has been customary to manufacture the mesh in a continuous strip and then to cut off pieces of the proper length for making handbags of the desired size. It is important that a piece of mesh for a given bag contain exactly the right number of rows of links and the practice heretofore followed to this end has involved actual count of the rows of links one by one by an operator. Such a procedure is time-consuming and correspondingly expensive, and moreover, it always involves the possibility of error. The object of this invention is to provide a machine that will perform this counting or measuring operation, that is to say, one that will measure off lengths of mesh from a continuous strip, so that each length contains the proper number of rows of links for making a bag of a particular size, and make a cut, mark or other suitable indication at the end of the measured or counted piece.

According to this invention, a continuous strip of mesh is fed to the measuring machine; the lengths of mesh containing the requisite number of rows of links are measured off and then the mesh is marked to designate the measured lengths. The machine comprises essentially a measuring roller provided with a number of counting pins on its periphery which are spaced apart a distance equal to the spacing between successive rows of links of the mesh, so that every revolution of the roller will count a number of links of mesh equal to the number of pins on the roller. For counting a greater or less number of links for larger or smaller mesh bags, the roller is rotated more or less than a complete revolution.

The measuring roller is intermittently driven in one direction an amount sufficient to measure the desired lengths of mesh; after completing a measuring operation it is then locked, at which time the marking mechanism comes into operation to mark the length of mesh that has just been measured. While the marking operation is taking place, the reciprocating driving mechanism for the roller is returning to its original position. By the time the driving mechanism has so returned, the marking operation has been completed, whereupon the roller is unlocked and driven ahead again to measure another length of mesh.

The driving mechanism for the roller is adjustable so that it may be made to rotate the roller the amount required to measure off the proper length of mesh. The number of measuring pins on the measuring roller is made about equal to the number of links that will be used in an average sized mesh bag. Then by regulating the amount of rotation of the measuring roller, the length of mesh for a smaller or larger bag than the average will be measured.

The features of the invention will be better understood by reference to the following description of the preferred embodiment thereof which is illustrated in the accompanying drawings. In these drawings

Referring now to the drawings, in which similar reference characters indicate similar parts, the machine comprises a bed plate 5 supported on the standards 6. A continuous strip of mesh, indicated at 7, is mounted on a roller 8 supported by the brackets 9. From the roller 8 the strip of mesh passes on to a conveyer belt 10 which runs on the idle roller 12. This belt carries the mesh to the measuring roller 13. After passing over the measuring roller where the measured lengths of mesh are marked the mesh passes over the roller 14 into a suitable receptacle 15.

Figure 1:
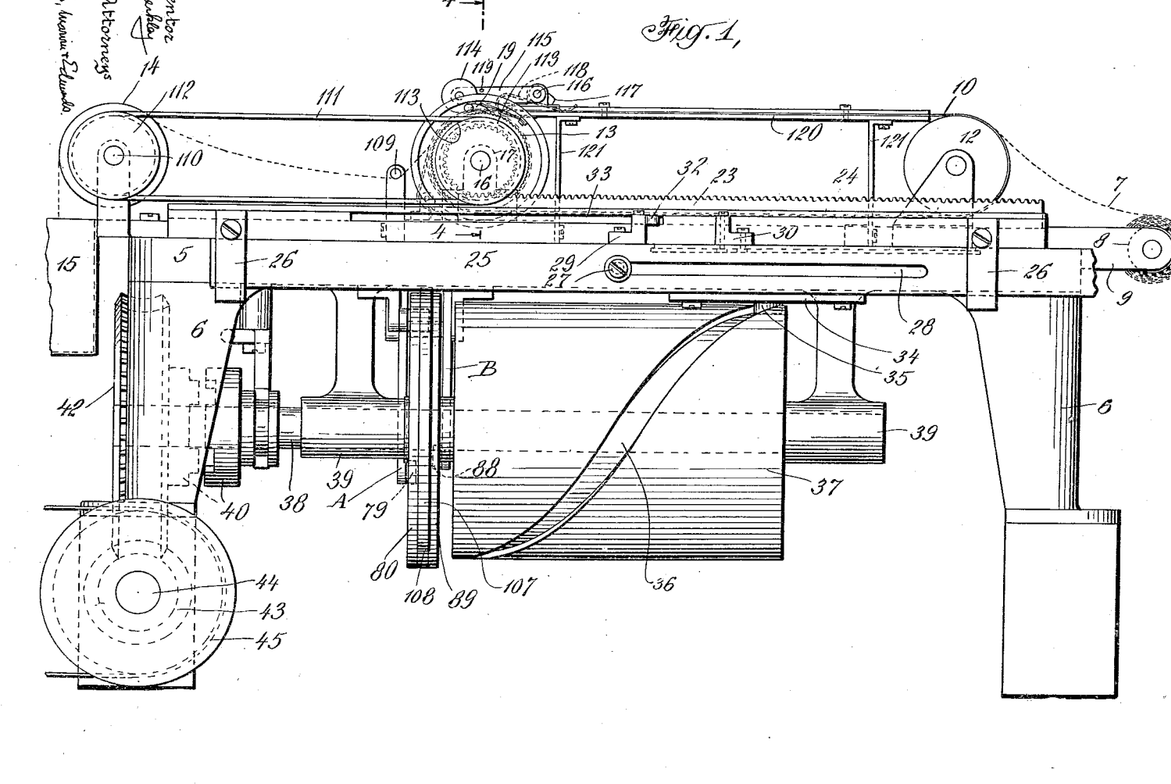
Fig. 1 is a side view of the complete machine.

The measuring roller 13 is mounted on the shaft 16 journaled in the bearings 17. The means for intermittently driving this roller will first be described. A disc 18 is mounted on and keyed to the shaft 16; this disc is provided with a spring pressed pawl 19. The pawl engages the ratchet wheel 20 which is made integral with or is fixed to the gear 22, the wheel 20 and gear 22 being loose on the shaft 16. The gear 22 meshes with a reciprocating toothed rack 23 which slides in a suitable guideway 24. It will be apparent at this point that when the rack 23 is moved to the left, looking at Fig. 1, gear 22 and ratchet wheel 20 will rotate without moving the roller 13. This movement of the rack 23 to the left may be designated its idle stroke. When the rack moves to the right, however, the roller 13 will be driven in a counter clockwise direction, looking at Fig. 1, due to the engagement between the pawl and the ratchet wheel. This movement of the rack 23 to the right may be designated its working or measuring stroke.

The means for reciprocating the rack will now be described. A slide 25 is mounted on slide blocks 26 mounted on the bed plate 5 of the machine. The slide is also guided in its movement by the pin 27 fixed to the bed plate engaging in the slot 28. The slide 25 is provided with a fixed abutment 29 and an adjustable abutment 30 which may be fixed in any desired position in the slot 31. Positioned between these abutments and attached to the rack 23 is a lug 32 which is movable in a slot 33. As the slide 25 moves back and forth the lug 32 will be moved back and forth in its slot to operate the rack 23 on its idle and working strokes. The length of these two strokes of the rack may be readily adjusted by moving the abutment 30 toward or away from the lug 32. That is to say, if the abutment 30 is moved to the left as far as possible so that lug 32 is gripped between abutments 29 and 30 without any lost motion, the rack 23 will be moved the same distance that the slide 25 is moved. By setting the abutment 30 further and further away from the abutment 29 it will be evident that the idle and working strokes of the rack 23 will be proportionately shortened, due to the lost motion of the lug 32 between the abutments 29 and 30. Since the rack 23 on its working stroke to the right rotates the measuring roller 13, the adjustment of the abutment 30 serves to regulate the length of mesh that is measured off by that roller.

The mechanism for reciprocating the slide 25 will now be described. This mechanism comprises a plate 34 attached to the under side of the slide and provided with a roller 35 that engages in the spiral-like cam groove 36 in the drum 37 that is mounted on and rotated by the main shaft 38. The drum 37 is continuously rotated in one direction, the groove 36 being so shaped that the slide 25 is moved the full length of the drum 37 upon each revolution of it.

The shaft 38 mounted in bearings 39 is driven through a clutch 40 from a worm gear 42 driven by the worm 43 on shaft 44 which in turn is driven by the pulley wheel 45.

Figure 8:
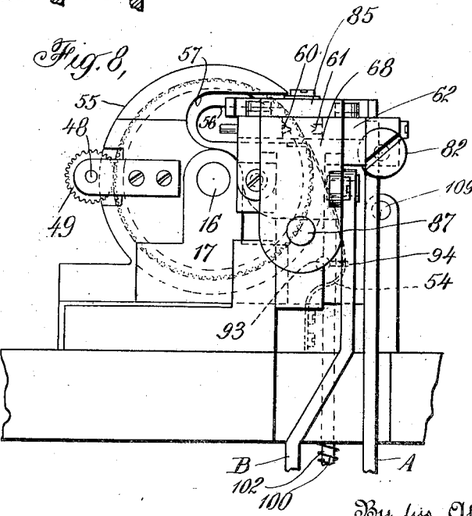
Fig. 8 is an enlarged end view of the upper part of Fig. 3 looking from the left.

To return now to the measuring roller 13, reference being particularly made to Figs. 3, 4, 5 and 6, the drive gear 46 is mounted on one end of the roller 13 and is keyed to the shaft 16. This gear, the teeth of which are flush with the outer surface of the roller 13 meshes with the pinion 47 mounted on the shaft 48, on which shaft gear 49 is mounted. This gear meshes with and drives the gear 50 provided with the counting pins 52. As is apparent from Fig. 8, gears 47 and 49 are on about the same level as the shaft 16 so as to be out of the way of the conveyer belt 10 and the mesh 7 being carried by it. The pins 52 are the pins for counting the links of mesh and are spaced apart a distance about equal to the distance between adjacent links, so that where one pin engages one link, successive pins will engage successive links with no uncounted links between. The number of pins used is made about equal to the number of links used in the average sized mesh bag, that is to say, about ninety-five. The pins may be numbered for ease in counting. The adjustable drive for the rack 23 and therefore for the shaft 16 and gear 50 has been already described. If the adjustment is so made that the shaft makes more than one revolution, more than ninety-five links will be measured, and if so made that the shaft makes less than one revolution, less than ninety-five links will be measured.

Figures 7, 9:
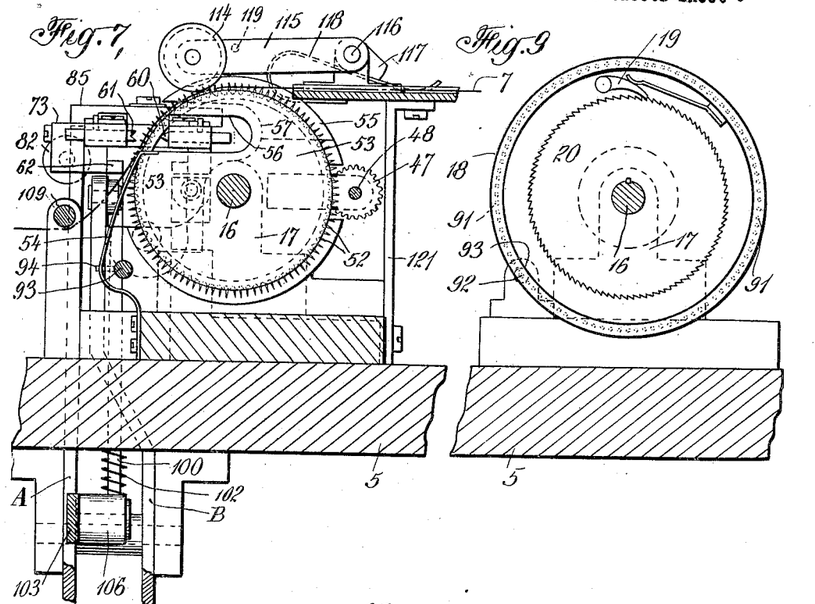
Fig. 7 is an enlarged sectional view on the line 7—7 of Fig. 3.
Fig. 9 is an enlarged sectional view taken on the line 9—9 of Fig. 3.

A stationary plate 53 is positioned between the gears 46 and 50, the purpose of which is to serve as a bearing for the resilient stripper finger 54 which extends underneath the mesh strip to strip it off the counting pins 52, as shown in Fig. 7.

The gear 50 rotates in a housing 55 which is mounted on the base 5 of the machine. The plate 53 is provided with an aperture 56 and the housing 55 is provided with a corresponding aperture 57 the purpose of which will appear.

The mechanism for notching the edge of the mesh to mark the measured lengths will now be described, reference being made particularly to Figs. 3, 5, 6, 7 and 8. The cutting mechanism itself comprises the cooperating cutting dies 60 and 61; 60 is on the inside and may be conveniently designated the inside cutter, while 61 is on the outside and may be designated the locating cutter. These cutters are mounted in the end of a cutter carrying slide 62 which is provided with slots 63 to allow for the movement of the pins 64 carried by the cutting dies. The cutter operating levers 65, provided with bifurcated ends 66 engaging with the pins 64, are pivotally mounted on the slide 62 by means of pins 67. The cutter carrying slide 62 slides on suitable guideways in the block 68 mounted on the base 5 of the machine. The slide 62 is provided with a lug 69 in which is threaded a set screw 70 which is adapted to bear against the abutment 72 on the block 68. Adjustment of the set screw 70 will accordingly limit the inward movement of the cutter carrying slide 62.

Figure 5:
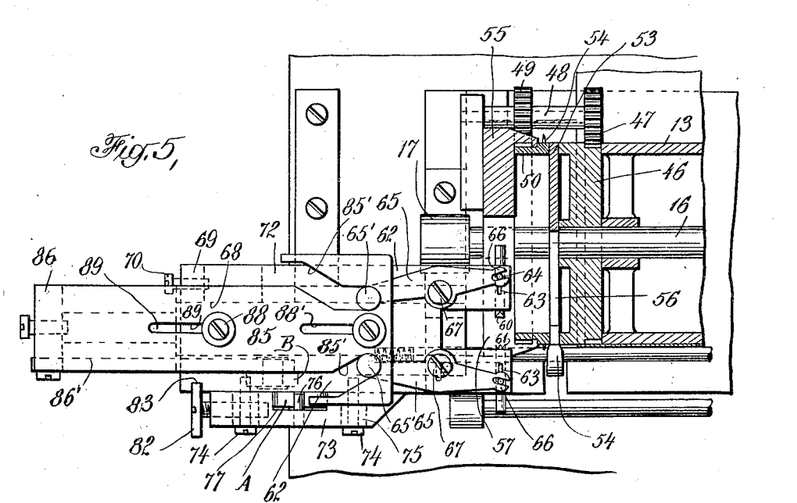
Fig. 5 is an enlarged view partially in section on the line 5—5 of Fig. 3 showing the details of the cutting or marking mechanism.

The mechanism for reciprocating the slide 62 toward and away from the mesh comprises a block 73 attached by bolts 74 to the slide, the block 73 being provided with slots 75 so that it may be adjustably positioned with respect to the slide 62. The block 73 is provided with a pin 76 which extends into a recess 77 in the block, this pin engaging with the bifurcated end of the operating lever A. This lever is shaped somewhat like a bell crank lever and is pivoted at 78 to the frame of the machine. The lower arm of the lever A is provided with a roller 79 which engages in the cam slot A' cut into a cam disc 80 mounted on the main drive shaft 38. The dwell portion of the cam groove is indicated at 81. It will be apparent that rotation of the cam disc 80 will cause a reciprocation of the slide 62. The exact amount of this reciprocation may be regulated by adjusting the block 73 back and forth by loosening the set screws 74 and turning the adjusting screw 82, the head of which moves in a groove 83 cut in the block 62. The cutters 60 and 61 are normally positioned, as shown in Fig. 5, in the aperture 57 of the housing 55, just outside of the edge of the mesh. When the cutters 60 and 61 are moved to the right by the lever A, the two cutters pass over the edge of the mesh like a pair of jaws with the inside cutter 60 on the inside and the locating cutter 61 on the outside. The inside cutter 60 and associated parts pass through the aperture 56 in the plate 53.

The mechanism for bringing the two cutting elements 60 and 61 into cutting engagement with the mesh comprises the cutter operating slide 85 which is provided with diverging grooves 85' in which rollers 65' carried on the ends of the cutter operating lever 65 are mounted. The slide 85 is slidably mounted on the slide 62 by means of pins 88 that engage with the cutter carrying slide 62. These pins engage in slots 88' in the cutter operating slide.

The cutter operating slide 85 is provided with a block 86 on its end which is connected to a guide rod 87 movable in an aperture in the block 68. A link 86' connects the block 86 to the upper end of the operating lever B which is a bent lever similar to the lever A and is pivoted like the lever A on the pin 78. The lower arm of the lever B is provided with a roller 88 which engages in a cam groove B' formed in the cam disc 89 mounted on the main shaft 38.

Figure 6:
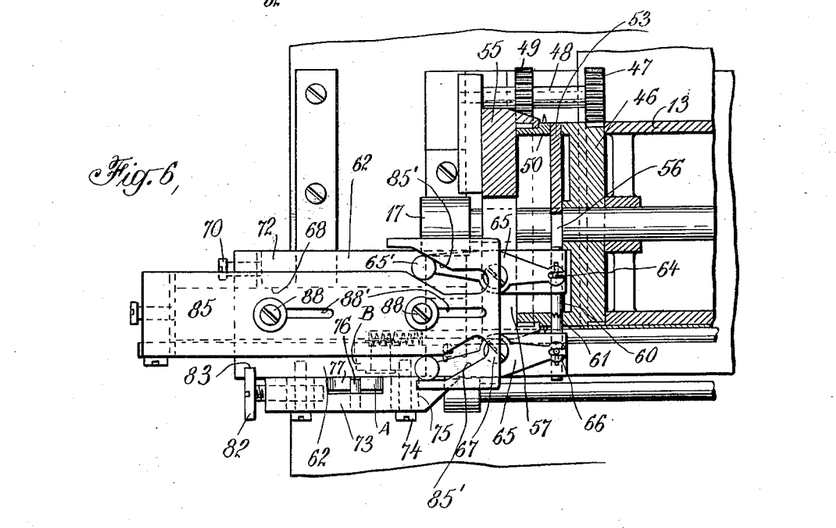
Fig. 6 is a similar view showing the parts in a different position.

From the relation of the two cam grooves A' and B' it will be seen that as the two cam discs 80 and 89 are rotated in a clockwise direction (Fig. 3) both the cutter carrying slide 62 and the cutter operating slide 85 will be moved to the right (Figs. 5 and 6). When the roller 79 gets to the dwell portion 81 of the cam groove A' the lateral movement of the cutter carrying slide 62 to the right is discontinued. The cam disc 89, however, operates the lever B to continue the movement of the cutter operating slide 85 relative to the cutter carrying slide 62, so that the rear ends of the levers 65 will be spread apart to thereby bring the cutters 60 and 61 into cutting engagement with the mesh, as is clearly shown in Fig. 6.

Figure 3:
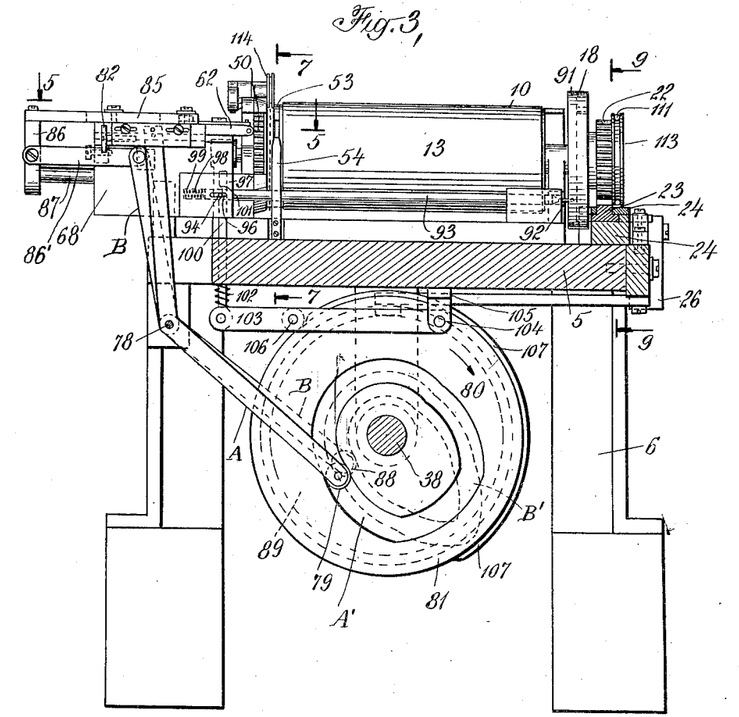
Fig. 3 is an end view looking from the left of Figs. 1 and 2.
Figure 4:
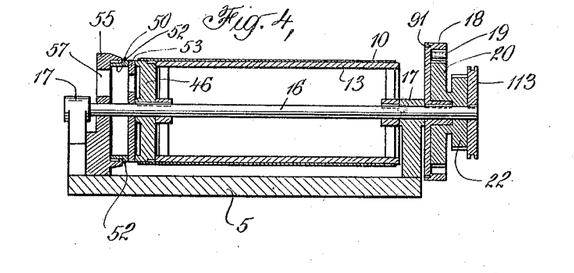
Fig. 4 is a section on the line 4—4 of Fig. 1.

While this cutting or marking operation is taking place, the roller 13 is locked and the mesh is held stationary by means which will now be described. Near the periphery of the disc 18 is a plurality of locking recesses 91. The number of such recesses may be conveniently the same as the number of counting pins 52, that is to say, about ninety-five. The locking pin 92, carried at one end of the movable locking rod 93, is engageable in these recesses to lock the disc 18 and therefore the roller 13. The locking rod 93 is provided with an actuating pin 94 which projects outwardly through a slot 96 cut in the block 97. The rod 93 moves in a recess 98 in the block 97 and is pressed to the right by a spring 99 positioned in that recess and bearing against the rod 93. A vertically reciprocating rod 100 provided with a cam groove 101 engages the pin 94 so as to move the rod 93 out of locking position at the appropriate time. When the pin 94 is in the groove 101 the spring 99 forces the rod 93 to the right to locking position. The rod 100 is normally urged downwardly by a spring 102 positioned between the bed plate 5 and the actuating lever 103 to which rod 100 is pivoted, as shown in Fig. 3. The lever 103 is pivoted at 104 to a bracket 105 and is provided intermediate its ends with a roller 106 which is engageable by a cam surface 107 which extends about half way around the edge of the cam disc 108. This disc is positioned between the cam discs 80 and 89 and is mounted on and actuated by the main shaft 38. It will be apparent from Fig. 3 that for about one-half of the revolution of the shaft 38 the roller 13 and associated parts will be locked by the locking pin 92 and unlocked for the remainder of the revolution. It should also be noted that this locking action is effective while the cutter carrying slide and cutter operating slide are moving toward the mesh, are cutting the mesh and are returning to their original position. The mesh, after it passes over the measuring roller and after it has been marked or notched by the cutters 60 and 61, passes under the guide rod 109 and thence over the roller 14 into the receptacle 15. The roller 14 is mounted on a shaft 110 that is driven by the belt 111 engaging with a pulley 112 on the shaft 110. The belt is driven from a pulley 113 mounted on the shaft 16.

In order to properly engage the edge of the mesh with the counting pins 52 there is provided a straddle roll 114 provided with a V-shaped groove in its periphery, into which the pins 52 enter after they have passed through the links of the mesh. The straddle roll 114 is mounted on a lever 115 pivoted at 116. The lever has a rear extension 117 which is engaged by a spring 118 to normally press it upwardly, and so as to hold the straddle roll in proper engagement with the mesh and counting pins 52. A handle 119 may be provided for lifting the straddle roll away from the mesh.

The conveyer belt 10 slides over a table 120 which is supported from the bed plate of the machine on standards 121. In order to properly guide the mesh along the table and into proper contact with the roller 13 and measuring pins 52, an adjustable guide strip 122 is provided along one edge of the table 120; this guide strip is held to the table by means of screws 123 positioned in slots 124 so that it may be adjusted to guide the mesh.

Figure 2:
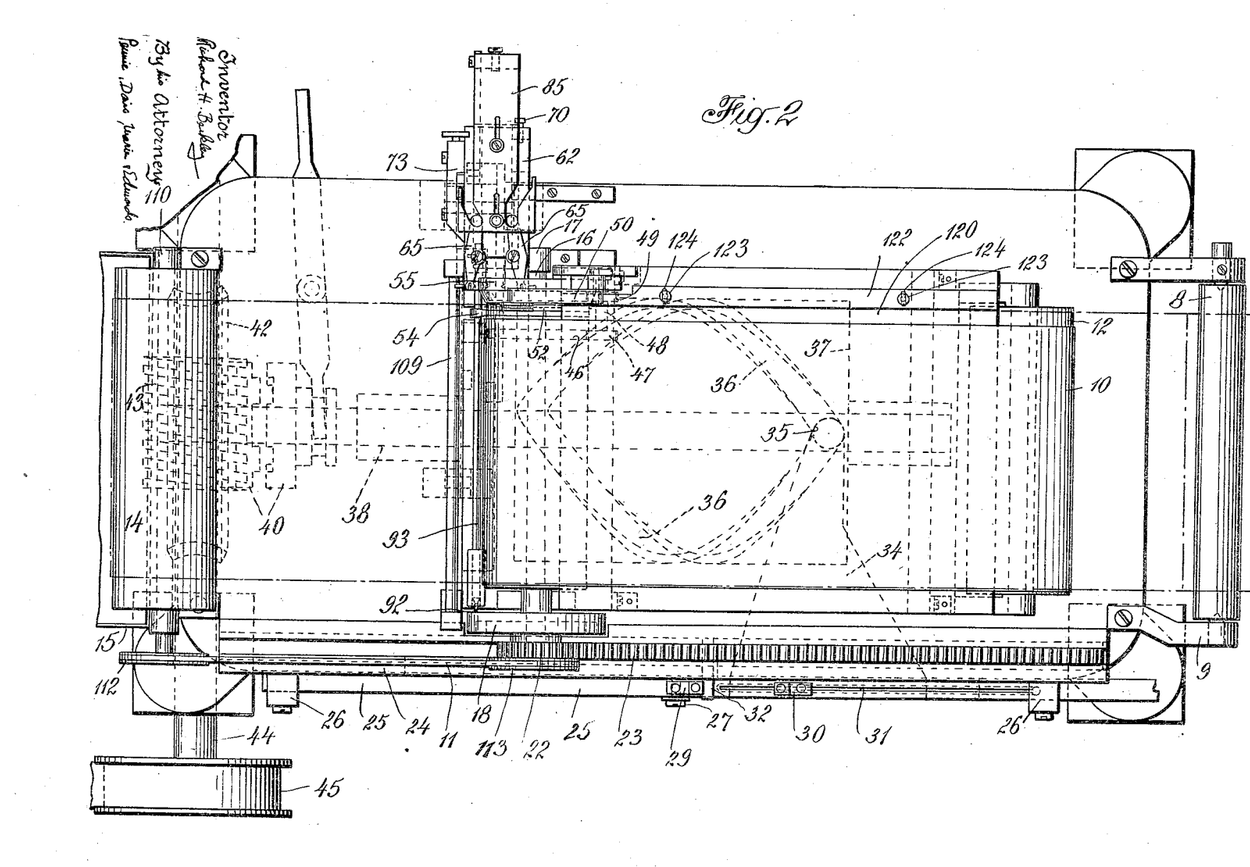
Fig. 2 is a top view of the same.

The machine operates as follows: A continuous roll of mesh is mounted on the roller 8 and is carried by the conveyer belt 10 toward the measuring roller 13. The edge of the mesh engages under the straddle roll 114 and over the counting pins 52. The strip of mesh now passes under the roll 109 and over the roll 14. The adjusting abutments 29 and 30 are set for the requisite amount of movement of the roll 13 and counting pins 52 to measure the desired length of mesh. Then as shaft 38 rotates in a clockwise direction (Fig. 3), the slide 25 and rack 23 are first moved to the right (Fig. 1) on the feed or working stroke which rotates the roller 13 and the counting pins 52 counter clockwise to measure off the desired length of mesh. After this operation the locking rod 93 is operated to lock the roller 13 and associated parts in fixed position. Then the cams 80 and 89 operate the bent levers A and B to move the cutters bodily toward the mesh so as to engage over the edge of the mesh; the cutter carrying slide 62 then stops due to the action of the dwell portion 81 of the cam groove A'; the cutter operating slide continues its inward movement, as shown in Fig. 6, to bring the cutters 60 and 61 together to cut a notch in the edge of the mesh. Continued rotation of the cams 80 and 89 causes a retraction of the cutter carrying slide and cutter operating slide to the position shown in Fig. 2. While the roller 13 is locked, as has been described, the slide 25 and rack 23 are being moved to the left (Fig. 1) on its idle stroke to return to the starting position. The pawl 19 which snaps over the teeth of the ratchet wheel 20 permits such idle stroke on the part of the rack 23. By the time that the rack 23 has returned to its original position, the cutting and marking operations have been completed and the cutters withdrawn out of the way so that the rack and counting pins are ready to be actuated to measure a new length of mesh. Using the marking notches cut by this machine in the edge of the mesh as guides, pieces of mesh for a complete bag may be readily cut from the strip by any desired device.

While I have illustrated one embodiment of my invention in considerable detail, it should be understood that the invention is not limited to this particular mechanism, but may be carried out in other ways as expressed within the scope of the following claims.

I claim:—

1. In a machine of the character described, the combination of a support for a piece of mesh of extended length, a member movable in contact with the mesh, and means actuated by movement of said member corresponding to a predetermined number of rows of links of the piece of mesh for acting upon the piece to indicate sections of the piece of predetermined length.

2. In a machine of the character described, the combination of a support for a piece of mesh of extended length, a member movable in contact with the mesh, a cutter and means controlled by said member for operating the cutter intermittently to cut the piece of mesh to indicate sections thereof containing a number of rows of links of the mesh corresponding to the magnitude of the movement of said member.

3. In a machine of the character described, the combination of devices for moving a continuous piece of mesh, means for acting upon the mesh at points spaced apart along the length of the piece to indicate sections of the piece of predetermined length, a member contacting with the piece of mesh as it is moved and moving in correspondence with the movement of the piece of mesh for controlling the action of said means.

4. In a machine of the character described, the combination of devices for moving a continuous piece of mesh, means for acting upon the mesh at points spaced apart equally along the length of the piece to indicate sections of the piece of a predetermined and equal length, a member contacting with the piece of mesh as it is moved and moving in correspondence with the movement of the piece of mesh for controlling the action of said means, and adjusting devices for regulating the action of the said controlling member to vary the number of rows of links in the sections of mesh between said indications.

5. In a machine of the character described, the combination of means for moving a continuous piece of mesh and means contacting with and operating in accordance with the movement of the piece of mesh for marking the piece of mesh at points spaced apart by a predetermined number of rows of links.

6. In a machine of the character described, the combination of means for moving a continuous piece of mesh, means contacting with, and operating in accordance with the movement of, the piece of mesh for marking the piece at points spaced apart by a predetermined number of rows of links, and means for effecting an adjustment for varying as desired the number of rows of links of the piece of mesh between adjacent markings.

7. In a machine of the character described, means for feeding a continuous strip of mesh through the machine, a member contacting with the piece of mesh as it is fed and moving in correspondence with the movement of the piece of mesh, means for stopping the travel of the mesh when it has been moved a distance corresponding to a predetermined number of rows of links of the mesh and means controlled by said member and brought into operation after the movement of the piece of mesh is arrested for acting upon the mesh to give an indication.

8. In a machine of the character described, the combination of means for moving a continous strip of mesh, a roller mounted for rotation in contact with the piece of mesh as it is fed and having its surface formed for coaction with the mesh whereby the mesh and roller will move in correspondence, a cutter and means controlled by said roller for operating the cutter intermittently to cut the piece of mesh at points indicating lengths of the piece of mesh determined by the magnitude of the rotation of the roller.

9. In a machine of the character described, the combination of means for moving a continuous strip of mesh, a mesh-measuring roller mounted for rotation in contact with the strip of mesh, means for rotating the roller to measure a given length of mesh, means for stopping the rotation of the roller after it has rotated a distance corrosponding to a predetermined number of rows of links of the mesh and a device cooperating with said means for acting upon the mesh to give an indication at the end of a predetermined length of the piece of mesh.

10. In a machine of the character described, a measuring roller, driving mechanism connected to the roller for driving it intermittently in one direction to measure lengths of mesh, means for actuating the driving mechanism in one direction to drive the roller and in the opposite direction to return the driving mechanism to its original position, and means for marking the measured lengths of mesh while the roller is stationary.

11. In a machine of the character described, a measuring roller, driving mechanism for the roller, a one-way clutch interposed between the roller and its driving mechanism and means for actuating the driving mechanism in one direction to operate the measuring roller and in the opposite direction for retracting the driving mechanism to its original position.

12. In a machine of the character described, a measuring roller, driving mechanism therefor, a one-way clutch interposed between the roller and its driving mechanism, means for regulating the travel of the driving mechanism so as to cause the roller to measure longer or shorter lengths of mesh, and means for marking measured lengths of mesh.

13. In a machine of the character described, a measuring roller, a reciprocating rack, connecting means comprising a one-way clutch connecting the roller and rack so that the roller is rotated by the rack when the rack is moved in one direction, but is stationary when the rack is moved in the opposite direction, means for reciprocating the rack, and means for marking the measured lengths of mesh.

14. In a machine of the character described, a measuring roller, a reciprocating rack, means comprising a one-way clutch for connecting the roller and rack, adjustable driving means for the rack so as to cause it to travel a longer or a shorter distance to thereby cause the roller to measure a longer or shorter length of mesh, and means for marking the measured lengths of mesh.

15. In a machine of the character described, a measuring roller, a reciprocating rack operatively connected to the roller so as to drive it in one direction only, a reciprocating slide for driving the rack back and forth, and an adjustable connection between the rack and the slide the adjustment of which gives a variable travel to the rack, whereby corresponding variable lengths of mesh are measured by the roller.

16. In a machine for measuring lengths of mesh from a continuous mesh strip, a measuring roller provided with a plurality of pins on its periphery adapted to engage in the links of the mesh, means for intermittently driving the roller in one direction, so as to measure lengths of mesh, and means for marking measured lengths of mesh on the strip while the roller is stationary.

17. In a machine of the character described, a measuring roller, means for driving the roller intermittently to measure lengths of mesh, a device actuated by said means for locking the roller after each measuring operation, and means for marking the measured lengths of mesh while the roller is locked.

18. In a machine of the character described, a measuring roller, means for driving the roller intermittently to measure lengths of mesh, a device actuated by said means for locking the roller after each measuring operation, and means operating while the roller is locked, for cutting the mesh to mark the measured lengths.

19. In a machine for measuring lengths of mesh from a continuous mesh strip, a measuring device, means for intermittently driving the measuring device to measure lengths of mesh, a device actuated by said driving means for locking the measuring device after each measuring operation, a marking cutter, and means, operative while the measuring device is locked, for moving the cutter toward the mesh and then into cutting engagement therewith.

20. In a machine for measuring lengths of mesh from a continuous strip, a measuring device engageable with the mesh, a cutting device comprising a pair of cutting jaws, means for moving the cutting device so that the mesh is positioned between the jaws and means for bringing the jaws together to cut the mesh.

21. In a machine for measuring lengths of mesh from a continuous strip, a measuring device, means for intermittently driving the measuring device for measuring lengths of mesh, a device actuated by said driving means for locking the measuring device after each measuring operation, a cutting device comprising a pair of cutting jaws, and means operative while the measuring device is locked for moving the cutting device toward the mesh and for then bringing the jaws together to cut the mesh.

22. In a machine for measuring lengths of mesh from a continuous strip, a measuring device engageable with the mesh, cutting mechanism comprising a cutter carrying slide and a cutter operating slide, means for operating the cutter carrying slide for bringing the cutting mechanism into proximity to the mesh, and means for operating the cutter operating slide to cause the cutting mechanism to cut the mesh.

23. In a machine for measuring lengths of mesh from a continuous strip, a measuring device engageable with the mesh for measuring lengths thereof, means coacting with said measuring device for locking the measuring device after each measuring operation, cutting mechanism comprising a cutter carrying slide and a cutter operating slide, means for operating the cutter carrying slide for moving the cutting mechanism into proximity to the mesh, and means for operating the cutter operating slide to cause the cutting mechanism to cut the mesh, the movements of the cutting mechanism taking place while the measuring device is locked.

24. In a machine of the character described, a mesh measuring and a mesh engaging roller, means for intermittently driving said roller to measure lengths of mesh, a device actuated by said driving means for locking the roller after each measuring operation, a cutting device comprising a pair of cutting jaws, means for moving the cutting device toward the roller so that the jaws pass over the edge of the mesh, and means for bringing the jaws together to cut the mesh, the movements of the cutting mechanism taking place while the mesh measuring roller is locked.

25. In a machine for measuring lengths of mesh from a continuous strip, the combination of a measuring roller engageable with the mesh, means for intermittently driving the roller for measuring lengths of mesh, a device actuated by said driving means for locking the roller after each successive measuring operation, and a common actuating means for the roller, the locking device and the cutting device.

26. In a machine for measuring lengths of mesh from a continuous mesh strip, a mesh engaging roller, a reciprocating rack engageable with the roller to drive it in one direction only to measure lengths of mesh, means for locking the roller after each successive measuring operation, means operative while the roller is locked for marking the measured lengths of mesh, and a common means for operating the reciprocating rack, the locking mechanism and the marking mechanism.

27. In a machine for measuring lengths of mesh from a continuous mesh strip, the combination of a measuring roller, reciprocating means engageable with the roller for driving it in one direction only so as to advance the roller intermittently to measure lengths of mesh, means for locking the roller after each successive measuring operation, means for marking the lengths of mesh measured by the roller, a drive shaft provided with a cam groove for operating the reciprocating mechanism, and cam means carried by the drive shaft for operating said locking mechanism and said marking mechanism.

28. In a machine for measuring lengths of mesh from a continuous mesh strip, the combination of a roller provided with a plurality of mesh engaging pins on its periphery, means for intermittently driving said roller to measure lengths of mesh, means for marking the lengths of mesh thus measured, and a straddle roll engageable with the mesh to press it into engagement with the pins on the roller.

29. In a machine of the character described, a measuring roller provided with a plurality of counting pins on its periphery, means for operating the measuring roller to measure lengths of mesh, means for marking the lengths of mesh so measured, and a stripping device to disengage the mesh from the counting pins.

In testimony whereof I affix my signature.

RICHARD HATLEY BERKLEY.